UNITED STATES PATENT OFFICE.

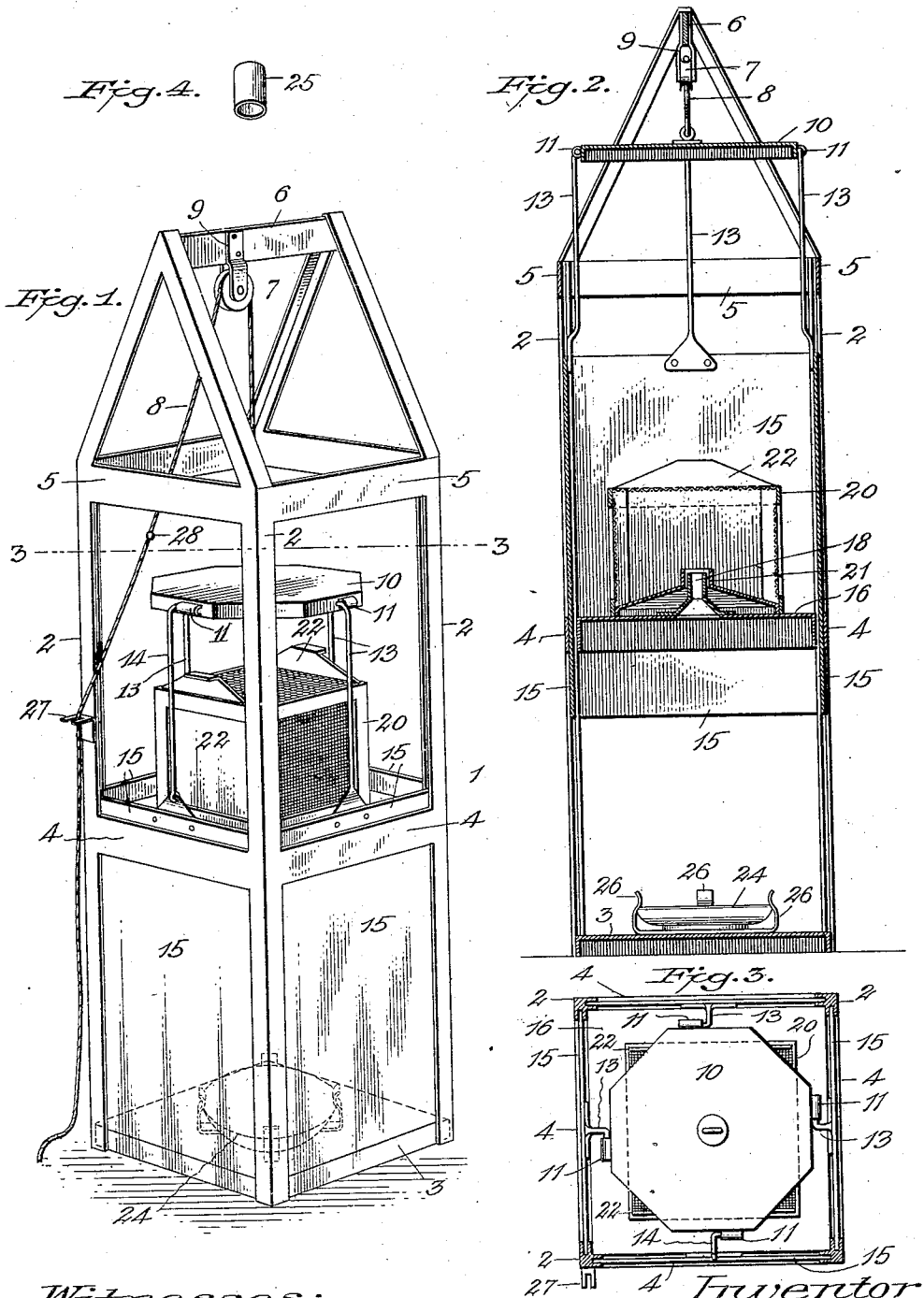

ROBERT GRISWOLD, OF DENVER, COLORADO.

FLY-TRAP.

969,363.  Specification of Letters Patent.  Patented Sept. 6, 1910.

Application filed January 29, 1910. Serial No. 540,805.

*To all whom it may concern:*

Be it known that I, ROBERT GRISWOLD, a citizen of the United States of America, residing in the city and county of Denver and State of Colorado, have invented a new and useful Fly-Trap, of which the following is a specification.

My invention relates to improvements in fly traps, and the objects of my invention are: to provide a device of this character comprising an upright oblong frame, which is preferably square in cross section, the side of the frame being open, and provided with vertically slidable doors, which are adapted to be raised in unison and also to drop by gravity in unison, said doors when dropped being arranged to inclose the lower half of the frame, a sealing plate being positioned midway of the frame having an outlet aperture which communicates with a removable cage, which rests on the ceiling plate, into which the flies or other insects entrapped by the dropping of the doors naturally find their way, the said cage having slide doors which permit the removal of the flies or insects after they have been destroyed in any suitable manner. I attain these objects by the mechanism illustrated in the accompanying drawings, in which:

Figure 1 is a perspective view of the improved fly trap, the doors being lowered, as when the flies are entrapped. Fig. 2 is a vertical, sectional view thereof, the doors being raised. Fig. 3 is a horizontal, sectional view on the line 3—3 of Fig. 1; and Fig. 4 is a perspective view of the cap for covering the ceiling plate outlet when the cage is being emptied.

Similar letters of reference refer to similar parts throughout the several views.

Referring to the drawings, the numeral 1 designates the frame of my improved fly trap. This frame is preferably made of galvanized iron, tin or other suitable material. This frame consists of four corner standards 2, which are preferably made of angular form. A floor portion 3 extends across and is secured to the bottom ends of the standards. The angular corner standards are connected together midway of their length to form a box-shaped open framework form of a vertically disposed fly trap by strips 4 and adjacent to their upper ends by side strips 5. From the upper side strips 5 the frame projects upward from two of the opposite sides of the frame and forms two triangular shaped top frames, which are united by a cross bar 6.

A sheave wheel 7 of a size adapted to receive a small cord 8 is pivotally mounted in a bracket 9, which is secured to the cross bar. One end of this cord extends to a plate 10, which I term a lifting plate. This lifting plate is provided with a loop or ring shaped clip 11 on each of its four sides, to three of which one end of wires 13 are secured. The remaining wire 14, however, is detachably hooked to its ring so as to be quickly unfastened from it when desired, as will be fully described hereinafter. The opposite ends of these four wires are secured to the upper ends of slide plates 15, which are vertically arranged in slideways formed in the corner standards 2. A plate 16 is secured to the standards about midway of the height of the trap, which I term the roof plate, and which is secured at its corners to the standards and is arranged to form a roof portion above the floor portion. These side plates are arranged to move vertically upward in their slideways when raised by the cord 8 and lifting plate 10 and the wires 13 and wire 14. These lifting side plates should be heavy enough to drop freely to the floor portion of the trap, on which they rest when not held up by the cord, and they are preferably made of galvanized iron. These four vertically movable sides and the four corner standards, together with the floor and roof portions, form the fly entrance chamber of my fly trap. This roof portion 16 is secured at its corner portion to the corner standards. The center of this roof portion is provided with a short tube 18, which surrounds an aperture through the roof from the chamber formed by the slides 15 and corner standards 2 and the floor of this roof portion. This tube projects up into a cage 20, which I term the fly cage, the bottom or floor portion of which is provided with a short upward tube 21, that is made to fit loosely over the roof tube 18. The cage comprises corner standards and a floor portion covered partially with fine wire screen cloth. I preferably cover only two opposite sides and the top portion of the cage with wire cloth, and the other two opposite sides with sheets of glass, tin or other suitable material 22. One or both of these glass sides admit more light to the interior of the cage than the tin sides would, but are easier broken. These glass or tin sides are removably set in slots formed in the corner standards of trap, which permit them to be easily and quickly removed from the frame of the cage. These glass or tin removable side plates permit the inside of the cage to be emptied of flies and to be washed or otherwise cleaned, when necessary, as will be explained fully hereinafter. This screened fly cage is adapted to set loosely on top of the roof 16 and over the tube 18 of the fly entrance chamber, and sufficient room is allowed between its top portion and the under side of the plate to permit it to be lifted off of the tube of the roof of the chamber and be removed from the trap entirely by disengaging the wire 14 from the plate and swinging it to one side far enough to permit the cage to be lifted out of the frame of the trap. The fly outlet tube in the top of the roof is preferably closed by a thimble 25, as shown in Fig. 4, which is provided for this purpose, and is arranged to be placed over the tube immediately when the cage is lifted off, and thus prevents the flies from leaving the chamber. A small receptacle, dish or pan 24 is placed in the chamber, and is preferably held in place by spider arms 26, which are soldered or otherwise secured to the floor of the chamber. This dish is adapted to hold any suitable fly attracting material or liquid.

To one of the standards on the side of the fly trap, on which the wire is detachable from the lifting plate, I secure a slotted bracket 27, and a knot 28 is formed in the cord, which is positioned to fasten the cord to the bracket, when the vertical lifting sides of the chamber are raised to form an opening into the chamber, by placing the cord in the slot and allowing the knot to be drawn by the weight of the plate and sides against the under side of the bracket.

The operation of my improved fly trap is as follows: To set the trap the cage is placed on the roof of the fly entrance chamber over the outlet tube 18. The detachable wire 13 is then hooked to its ring in the plate, and the cord is pulled down until the four sides of the fly entrance chamber are raised up a sufficient distance above the floor to permit flies to readily enter. The dish is then supplied with a fly attracting material. The flies then enter the chamber, and as the upper portion of the chamber is dark they are attracted upward through the roof tube into the cage by the daylight or by the light of a lighted room, and they fly up through the tube into the light that enters the cage through its screened surfaces and are trapped therein, as they are not liable to fly or walk downward again through the tube into the dark upper portion of the chamber. The side plates are left up until the cage is well filled with flies, or in case the chamber is full of flies the cord is pulled from the slot in the bracket and they are allowed to drop to the floor. The flies thus imprisoned in the chamber will fly or walk up through the roof tube into the cage, as the light will be brighter in the cage when the side plates are down and the chamber is dark within, and the flies will move faster up into the cage. This intermittent opening and closing of the side plates may be produced, if desired, in preference to leaving the side plates open until the cage is well filled with flies. When, however, it is desired to destroy the flies in the cage, the side plates are dropped to the floor of the chamber. The wire 14 is then unhooked from the spreader plate and swung over against the side of its chamber plate. The cage is then lifted from the roof of the chamber and is taken out of the frame of the fly trap, and the instant it is lifted out of the frame the thimble 25 is placed over the end of the tube 18 in the roof, and the thimble prevents any flies that may be within the chamber from escaping through the tube. The cage is then placed or thrown into a body of water, preferably hot water, until the flies are dead. The sliding sides of the cage are then removed and the flies are washed or otherwise discharged from it. The sides are then replaced and the cage is placed again on the roof of the chamber over the roof tube, after removing the thimble.

My invention makes an attractive, practical, easily manipulated fly trap that can be kept clean, and it will trap flies in such a manner that they do not present an objectionable appearance.

Having described my invention, what I claim as new and desire to secure by Letters Patent is:

1. In a fly trap, the combination of a frame consisting of four corner posts secured to a floor and ceiling portion and arranged with open spaces between said corner posts, slideways in the edges of the posts and slots through said ceiling in alinement with said slideways, independent side portions slidably mounted in said slideways, said posts extending above said ceiling and provided with cross bars, a pulley secured to one of said cross bars, a rod extending from each side upwardly and connected to a plate positioned above said ceiling between said posts, and a cord connected to said plate at one end and extending over said pulley, a clip on one of said posts and means for securing said cord to said clip, a chamber in said frame provided with a fixed floor and roof portion, said floor portion being adapted to hold a dish adapted to hold a supply of any suitable fly attracting material, said cord and plate and rods being arranged to raise and secure said sides in a raised position simultaneously a predetermined distance; an aperture through the roof of said chamber; a cage, provided with screened portions, mounted on said roof and provided with an aperture arranged to form a fly passage from said chamber and its aperture into said cage, said cage being provided with removable side portions, and means for releasing and allowing the independent sides of said chamber to drop simultaneously by gravity and close the open spaces between the corner posts of said frame.

2. In a fly trap, the combination of a frame provided with a cord pulley at its top and a chamber at its lower end provided with movable sides arranged when closed to provide a darkened chamber, and when open to form an open side portion in the sides of said cabinet adapted to admit flies to the interior of said cabinet, said chamber being provided with a raised spider portion adapted to hold a dish provided with a supply of fly attracting material; a cord extending over said cord pulley; a spreader plate secured to one end of said cord; a wire or cord connection between the movable sides of said cabinet and said spreader plate, one of which is detachably removable; a screened fly holding cage on said chamber; a fly passage from said chamber to said cage; a removable portion on said cage, and means including said cord for securing the sides of said chamber in a raised position and for re-closing said sides to allow them to close said chamber.

3. In a fly trap, the combination of the standards, provided with the fixed floor and roof plates, and the top portion provided with a cross bar; the cord pulley pivotally supported by said cross bar; the cord mounted on said pulley; the spreader plate attached to one end of said cord; the vertically movable side plates of said chamber slidably mounted in slideways formed in said frame; the spider on the floor of said chamber; the dish mounted on said spider, and the fly outlet tube extending above the roof of said aperture, with a screened cage provided with opening side portions, said screened cage being provided with an aperture on its bottom enough larger than said tube to permit said cage to be placed over said tube and rest on the roof portion of said chamber, and means including a bracket for securing said cord to hold said chamber's sides in a raised position and thus to open said chamber and to instantly release said cord and permit said sides to freely drop and close said chamber.

4. In a fly trap, a structure comprising four corner standards connected by side strips; a floor secured to the lower ends of the standards; a roof plate, having an aperture, secured to the standards midway of their length; doors mounted to slide in said standards; rods connected to said doors; a pulley at the top of the structure; a cord extending around said pulley and connected to the said rods, whereby the doors may be raised in unison; a catch plate on one of the standards for engaging the cord to hold the doors raised, said doors being adapted to drop by gravity when the cord is released; a removable cage which rests on the roof plate, having an aperture in its bottom which registers with the aperture in the roof plate, and a removable side in said cage.

In testimony whereof I affix my signature in presence of two witnesses.

ROBERT GRISWOLD.

Witnesses:
G. SARGENT ELLIOTT,
ADELLA M. FOWLE.